US006853948B2

(12) United States Patent
Jewell

(10) Patent No.: US 6,853,948 B2
(45) Date of Patent: Feb. 8, 2005

(54) USING CONDUCTIVE NIPPED ROLLERS TO MEASURE MEDIA LENGTH

(75) Inventor: Robert W. Jewell, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 63 days.

(21) Appl. No.: 10/376,563

(22) Filed: Feb. 28, 2003

(65) Prior Publication Data

US 2004/0172214 A1 Sep. 2, 2004

(51) Int. Cl.[7] .......................... G01B 21/02; G01B 5/02; G01B 7/02

(52) U.S. Cl. ......................... 702/158; 702/163; 33/735; 399/16

(58) Field of Search ........................... 702/577, 64, 9.4, 702/97, 55, 158, 159, 163, 164; 700/57, 61, 303; 33/711, 732, 733–736, 747, 748; 101/485, 486; 399/16, 182, 193, 401

(56) References Cited

U.S. PATENT DOCUMENTS 4,849,915 A * 7/1989 Worsley et al. ............. 702/163
5,639,171 A 6/1997 Brewster, Jr. et al.
5,864,774 A 1/1999 Jones
5,915,691 A * 6/1999 Deguchi et al. ....... 271/265.01
5,930,577 A * 7/1999 Forsthoefel et al. ........ 399/401
5,940,106 A * 8/1999 Walker ....................... 347/104
6,243,545 B1 6/2001 Jewell
6,315,473 B1 11/2001 Slippy
6,603,953 B2 * 8/2003 Jewell ........................ 399/395

FOREIGN PATENT DOCUMENTS

JP 08301485 A * 11/1996 ........... B65H/07/14

* cited by examiner

*Primary Examiner*—Hal Wacheman
*Assistant Examiner*—Manuel L Barbee

(57) ABSTRACT

Representative embodiments provide for an imaging apparatus including a controller, a first imaging engine and a second imaging engine, each coupled with the controller and configured to form images on sheet media, and a nip assembly configured to pass a sheet media. The imaging apparatus including a circuit electrically coupled to the nip assembly and coupled with the controller, the circuit configured to provide a length signal to the controller corresponding to a length of a sheet media passed through the nip assembly, and wherein the controller is configured to control normal operation of the second imaging engine in correspondence to the length signal. Also provided is a method, including imaging a first side of a sheet media, passing the sheet media through a nip assembly, determining a length of the sheet media, and selectively imaging a second side of the sheet media in correspondence to the length.

29 Claims, 4 Drawing Sheets

USING CONDUCTIVE NIPPED ROLLERS TO MEASURE MEDIA LENGTH

BACKGROUND

Imaging apparatuses that form images on sheet media are known in the art. Some types of such apparatus employ imaging engines (or devices) that apply a liquid composition (generally referred to as ink, but not necessarily India ink or toner) to sheet media under the influence of an electronic controller. Non-limiting examples of such imaging engines include printing presses. Other similar types of imaging engine are known.

Some such apparatus include two independent imaging engines, each configured to produce images on respective sides of sheet of media, thereby producing a two-sided document (i.e., a document whose individual sheets of media bear images on both sides). One way that this can be performed is to image a first side of sheet of media using one imaging engine, and then pass that sheet of media onto another imaging engine, which forms images on the second side. Thus, a first imaging engine is used to image a first media side, and a second imaging engine is used to image a second side of the same media.

During such a process, the act of imaging the first side of the media tends to affect a lengthwise dimension of the sheet of media, prior to imaging the second side, resulting in undesirable registration (i.e., front-to-back alignment) of the first imaged side with the second image side. Furthermore, the magnitude of such undesirable registration (or error) can vary with different types of sheet media, changes in the composition of the applied liquid, etc.

Therefore, it is desirable to provide an apparatus and method which addresses these and other undesirable registration problems as described above.

SUMMARY

One embodiment provides for a sheet media length detection device, including a nip assembly including a first rotatable member and a second rotatable member, each at least partially electrically conductive and respectively configured to rotate in contact with each other. The nip assembly is configured to selectively pass a sheet media between the first and the second rotatable members at a known speed. The sheet media length detection device also includes a source of electrical energy, and a sense element electrically coupled to the source of electrical energy and the first and the second rotatable members, the sense element configured such that a first or a second electrical potential is present across the sense element in respective correspondence to the presence or absence of a sheet of media between the first and second rotatable members. Further included is a sense circuit electrically coupled to the sense element and configured to provide a length signal in correspondence to a length of a sheet of media passed between the first and the second rotatable members in response to monitoring the first and the second electrical potentials across the sense element.

Another embodiment provides for an imaging apparatus, including a controller and a first imaging engine coupled in control signal communication with the controller and configured to selectively form images on a sheet media. The imaging apparatus also includes a second imaging engine coupled in control signal communication with the controller and configured to selectively form images on a sheet media, and a nip assembly including an at least partially electrically conductive roller and an electrically conductive wheel. The nip assembly is configured to pass a sheet media from the first imaging engine to the second imaging engine. The imaging apparatus further includes a circuit electrically coupled to the nip assembly and coupled in signal communication with the controller, the circuit configured to provide a length signal to the controller corresponding to a length of a sheet media passed through the nip assembly. Furthermore, the controller is configured to selectively control a normal operation of the second imaging engine in correspondence to the length signal.

Yet another embodiment provides for an imaging apparatus, including a controller and an imaging engine coupled in control signal communication with the controller and configured to selectively form images on a sheet media. The imaging apparatus also includes a nip assembly including an at least partially electrically conductive roller and an electrically conductive wheel, the nip assembly configured to pass a sheet media to the imaging engine. The imaging apparatus further includes a circuit electrically coupled to the nip assembly and coupled in signal communication with the controller, the circuit configured to provide a length signal to the controller corresponding to a length of a sheet media passed through the nip assembly. Furthermore, the controller is configured to selectively control a normal operation of the imaging engine in correspondence to the length signal.

Still another embodiment provides for a method of controlling an imaging apparatus, including the steps of selectively imaging a first side of a sheet media, passing the imaged sheet media through a nip assembly, and detecting a change in electrical potential in correspondence to the passing. The method further includes determining a length of the sheet media in response to the detecting, providing a length signal in response to the determining, and selectively imaging a second side of the sheet media in correspondence to the length signal.

Yet another embodiment provides for a sense circuit for use with an imaging apparatus, including a processor, an oscillator coupled in signal communication with the processor and configured to generate a stream of substantially regular clock pulses, and a computer-readable storage media coupled in data communication with the processor and storing a program code. The program code is configured to cause the processor to monitor an electrical potential signal, count a plurality of the clock pulses generated by the oscillator during a predefined shift in the electrical potential signal, and provide a length signal on a signal line of the processor in correspondence to the counted plurality of clock pulses.

These and other aspects and embodiments will now be described in detail with reference to the accompanying drawings, wherein:

DETAILED DESCRIPTION

In representative embodiments, the present teachings provide methods and apparatus for measuring a lengthwise dimension of a sheet media, providing a corresponding length signal to a controller, and using the length signal during the control of normal operation of an imaging engine.

Figure 1:
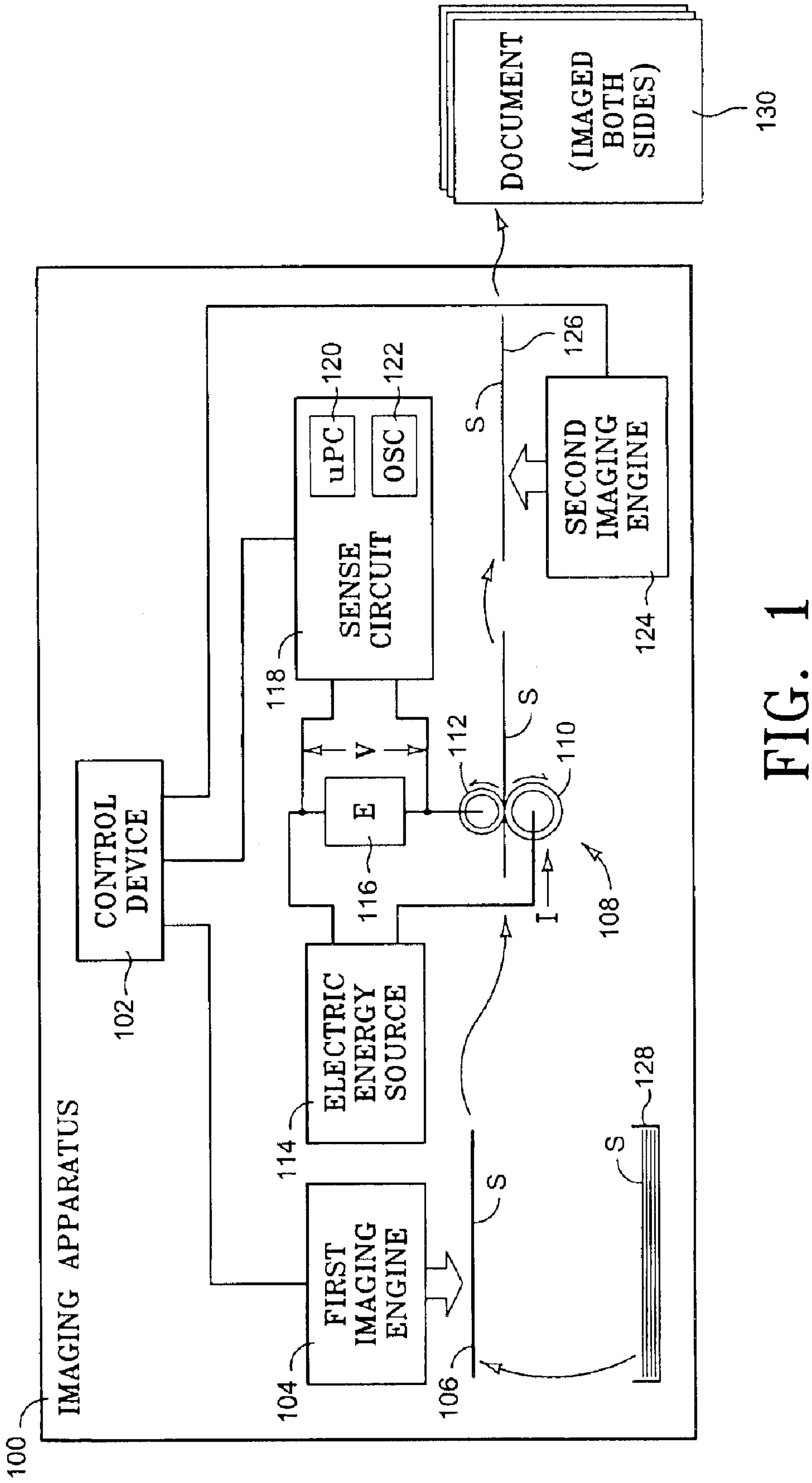
FIG. 1 is a block diagram depicting an imaging apparatus in accordance with an embodiment of the present invention.

Turning now to FIG. 1, a block diagram depicts an imaging apparatus 100 in accordance with an embodiment of the present invention. The imaging apparatus 100 includes control device (controller) 102. The controller 102 can be defined by any suitable electronic circuitry that can be used to control typical normal operations (described hereafter) of the imaging apparatus 100. In one embodiment (not shown), the controller 102 includes a microprocessor or a microcontroller. Those of skill in the imaging control and related arts can appreciate that the specific embodiment of the controller 102 can be defined and/or selected as needed within the scope of the present invention, and that specific elaboration is not required for purposes herein.

The imaging apparatus 100 further includes a first imaging engine 104. The first imaging engine 104 can be defined by a printing press, an electrophotographic device, or any other suitable device that can form images on sheet media, by way of the application of a suitable liquid compound or compounds (i.e., "ink, toner, etc"), and under the control of the controller 102. Therefore, first imaging engine 104 is coupled in control signal communication with the controller 102. As shown in FIG. 1, the first imaging engine 104 is configured to image a first side 106 of a sheet media S.

The imaging apparatus further includes a nip assembly 108. The nip assembly 108 includes a roller ("first rotatable member") 110. The roller 110 can be formed from any suitable, at least partially electrically conductive pliable material. In one embodiment, for example, the roller 110 is formed from a composite rubber material of suitable electrical conductivity. Other compounds can also be used to form the roller 110. The roller 110 is supported within the imaging apparatus 100 in a rotatable manner. As shown in FIG. 1, the roller 110 is supported so as to freely rotate under the friction-contacting influence of a moving sheet of media S (described hereafter). In another embodiment (not shown), the roller 110 rotates at a substantially constant angular velocity under the influence of an electric motor (not shown). Other suitable configurations of the roller 110 are possible.

The nip assembly 108 further includes an electrically conductive wheel (also known as a "complimentary roller" or a "second rotatable member") 112. The wheel 112 can be formed from any suitable material that is at least partially electrically conductive. In one embodiment, the wheel 112 is formed from brass metal. In another embodiment, the wheel 112 is formed from bronze metal. In yet another embodiment, the wheel 112 is formed from substantially the same kind of at least partially electrically conductive material as the roller 110. Other materials can be used to form the wheel 112. The wheel 112 is supported so that it is normally in rotatable contact with the roller 110, thus defining a nip arrangement. Furthermore, the wheel 112 and roller 110 are further supported so as move apart from each other during the passage of sheet of media S there between. Alternately, one or both of the roller 110 or the wheel 112 can be covered with a compliance covering which is at least partially electrically conductive.

The imaging apparatus 100 also includes an electric energy source 114. The electric energy source 114 can be defined by any suitable direct-current (DC) or alternating-current (AC) source of electrical power. Typically, the electric energy source 114 is defined by a DC power supply. The imaging apparatus 100 further includes a sense element 116. The sense element 116 is typically defined by a resistor. However, a diode or other suitable semiconductor device can also be used to define the sense element 116. The electric energy source 114, the sense element 116, the roller 110 and the wheel 112 are electrically coupled to form an electric circuit, referred to herein as a sheet media length detection device.

The imaging apparatus 100 further includes a sense circuit 118. As shown, the sense circuit 118 includes a microprocessor 120 and an oscillator 122, respectively electrically coupled in cooperative relationship. In another embodiment (not shown), the sense circuit 118 is defined by any suitable electronic circuitry consistent with the scope of the present invention. The sense circuit 118 is electrically coupled across the sense element 116, and is configured to sense (monitor) an electrical potential "V" appearing across the sense element 116. To that end, the sense circuit 118 can include any other suitable electronics as required to monitor the electrical potential V and to communicate with the controller 102 using electrical signals.

The imaging apparatus 100 also includes a second imaging engine 124. The second imaging engine 124 is typically defined by the same kind of device or apparatus as the first imaging engine 104, although the first imaging engine 104 and the second imaging engine 124 can differ, if desired. In any case, the second imaging engine 124 is coupled in control signal communication with the controller 102, and is configured to form images on a second side 126 of a sheet media S.

It is to be understood that other elements (not shown) typical to the normal operation of imaging devices are present in the imaging apparatus 100. Non-limiting examples of such elements can include electrical power supplies, sheet media guiding and transporting devices, operator interface devices, etc. Such elements can be respectively provided in any number of suitable forms, and their specific definition is not required for an understanding of the present invention.

Figure 2:
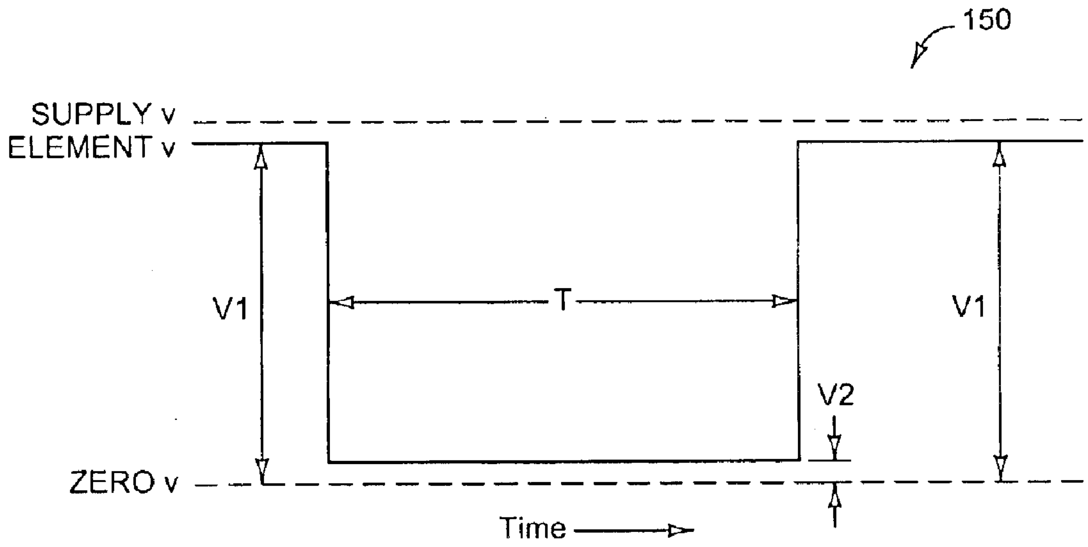
FIG. 2 is a signal plot depicting an electrical waveform in accordance with one aspect of the present invention.

Simultaneous reference is now made to FIGS. 1 and 2. FIG. 2 is a signal plot 150, representing the electrical potential V across the sense element 116 (ELEMENT in FIG. 2) with respect to time, and relative to zero and electric energy-source potential voltages (ZERO and SUPPLY in FIG. 2, respectively), during normal operation of the imaging apparatus 100. Typical normal operation of the imaging apparatus 100 is as follows: To begin, it is assumed that the electric energy source 114 provides an electrical current "I" that flows through the roller 110, the wheel 112, and the sense element 116, resulting in an electrical potential V of a voltage V1 across the sense element 116 (see FIG. 2). In this assumed condition, there is no sheet media present within the nip assembly 108 (that is, between the roller 110 and the wheel 112).

The controller 102 then initiates an imaging (i.e., print) job, as received, for example, from a user computer (not shown) coupled to the imaging apparatus 100 and issues signals for sheet transport and guiding devices (not shown) to extract a sheet of media S from an input tray 128, and to guide the sheet media S into cooperative position with the first imaging engine 104. The first imaging engine 104 then forms images on the first side 106 of the sheet media S, under the control of the controller 102. Once this initial imaging is complete, the controller 102 then signals the sheet transport and guiding devices (not shown) to move the sheet media S onto the nip assembly 108.

Upon arrival at the nip assembly 108, a leading edge of the sheet media S is transported (or drawn) into the nip, thus physically separating roller 110 and the wheel 112. This physical separation of the roller 110 and the wheel 112 results in a detectable decrease in the electrical current "I" flowing from the electrical energy source 114, through the roller 110 and the wheel 112, and on through the sense element 116.

This decrease in current "I" results in a corresponding decrease (i.e., change) in the electrical potential V across the sense element 116. This decreased electrical potential V is shown as voltage V2 in FIG. 2. In response to this change in potential V, the microprocessor (or microcontroller) 120 of the sense circuit 118 begins counting clock pulses that are provided by the oscillator 122.

As the microprocessor 120 counts clock pulses, the imaged sheet media S is transported (or drawn) through the nip assembly 108 in a substantially constant, known forward velocity. In response, the roller 110 and the wheel 112 rotate in contact with respective first and second sides of the sheet media S. Ultimately, the trailing edge of the sheet media S exits the nip assembly 108, having moved through the nip assembly 108 in a total transit time "T", as shown on the plot 150 of FIG. 2. In response to this exiting of the sheet media S, the roller 110 and the wheel 112 resume physical contact with one another, leading to the substantial return of the voltage V1 across the sense element 116.

In response to the detected return of the voltage V1 across sense element 116, the microprocessor 120 then calculates a length for the imaged sheet media S that just passed through the nip assembly 108, using the count of clock pulses which transpired during the transit time T. The sense circuit 118 then provides a corresponding length signal to the controller 102.

Typically, the rate of forward movement (i.e., velocity) of the sheet S is known based on knowing the rotational speed of one or both of the roller 110 or the wheel 112, and knowing the circumference of the roller and/or wheel. Thus, for example, if roller 110 rotates at 2 revolutions per second and the circumference of the roller 110 is one inch (2.54 cm), then sheet "S" will be moved through the nip between the roller 110 and the wheel 112 at a rate of 2 inches per second (5.08 cm/sec). Accordingly, by multiplying the known sheet velocity by the measured time T, the length of the sheet S can be determined. Other means for determining the velocity of the sheet can be also be used. For example, a first edge detector and a second edge detector (e.g., each detector including a light source and photodetector), spaced a known distance apart, can be positioned on either side of the nip assembly 108. As the forward edge of the sheet S blocks the first edge detector, a timer can be initiated within the microprocessor 120. When the leading edge of the sheet S blocks the second edge detector, the timer can be stopped. By knowing the distance between the edge detectors, the velocity of the sheet S can be determined by multiplying the distance between the edge detectors by the measured time. In another example, a roller/wheel length measuring device (similar to that provided by nip assembly 108) can be provided prior to the first imaging engine 104. Since the length of the sheet "S" can be known at this time (e.g., if letter-size paper is being used, the length is 11 inches, and if A4 size paper is being used, the length is 29.69 cm). By measuring the length of time it takes the sheet of known length to pass between the roller and wheel, the velocity can be measured (i.e., known length of the sheet divided by time equals velocity). Further, more than one means for determining the sheet velocity can be used, and the velocities can then be averaged by the microprocessor 120 to arrive at a more accurate determination of sheet velocity.

Once the length of the sheet S is determined, the controller 102 then uses the length signal provided by the sense circuit 118 to control the second imaging engine 124 so that a second side 126 of the sheet media S is imaged in desired registration with that of first side 106. This process is then repeated one sheet of media S at a time, as required by the print job, resulting in the two-sided document 130. So, for example, if the controller 102 determines that the length of the sheet S has increased by 0.10 inches over its original length (the original length typically being known, or can be measured prior to introducing the sheet to the first imaging engine 104, as described above), and if the image to be printed on the second side 126 of the sheet is to be centered on the sheet, then the controller will delay generating the second-side image on the second side of the sheet until an additional sheet length of 0.05 inches has passes beyond the leading edge of the sheet and any imposed top margin. In one variation, an assumption can be made that generating the image on the second side 126 of the sheet S will result in further elongation of the sheet. Accordingly, the microprocessor 120 can be provided with an algorithm to determine the anticipated additional sheet elongation resulting from imaging the second side 126 of the sheet by the second imaging engine 124, and can adjust the initial printing of the image on the second side accordingly. For example, if the assumption is made (based on determining the increase in length of the sheet S resulting from imaging the first side of the sheet by the first imaging engine 104) that a length increase of 0.10 inches will occur as a result of generating an image on a side of the sheet, then it can be assumed that a secondary elongation of 0.10 inches will result from imaging the second side 126 of the sheet. In this case, if the image to be printed on the second side 126 of the sheet S is to be centered, then generation of the second side will be delayed for 0.10 inches (the sum of half of each of the elongations). In another variation, if the assumption is made that elongation of the sheet S results essentially directly from the quantity of ink placed on the sheet to generate the image, then the size of the image to be generated on the second side 126 of the sheet S can be compared to the size of the image to be generated on the first side 106 of the sheet. The measured increase in length of the sheet resulting from generating the image on the first side 106 can then be compared to the ratio of the image size for each side of the sheet, and the delay for generating the image on the second side 126 calculated accordingly.

It is to be understood that the elements and operations just described in regard to the imaging apparatus 100 of FIG. 1 can vary as desired within the context of the present invention. For example, in one embodiment of the sense circuit 118, the microprocessor 120 is defined by a microcontroller including a built-in read only memory (ROM). Such a ROM within the microcontroller can store a program code which enables the microcontroller to perform substantially all of the electrical potential monitoring, clock pulse counting, calculating, and length signaling operations described above. Other embodiments of the sense circuit 118 can also be used.

In another example, an embodiment of the nip assembly 118 uses a roller 110 that is propelled by motor drive (not shown) so as to draw the sheet media S through the nip assembly 108 at a known, substantially constant forward velocity, thereby maintaining a direct correspondence between the length of the sheet media S and the time required to transit the nip assembly 108.

Figure 3:
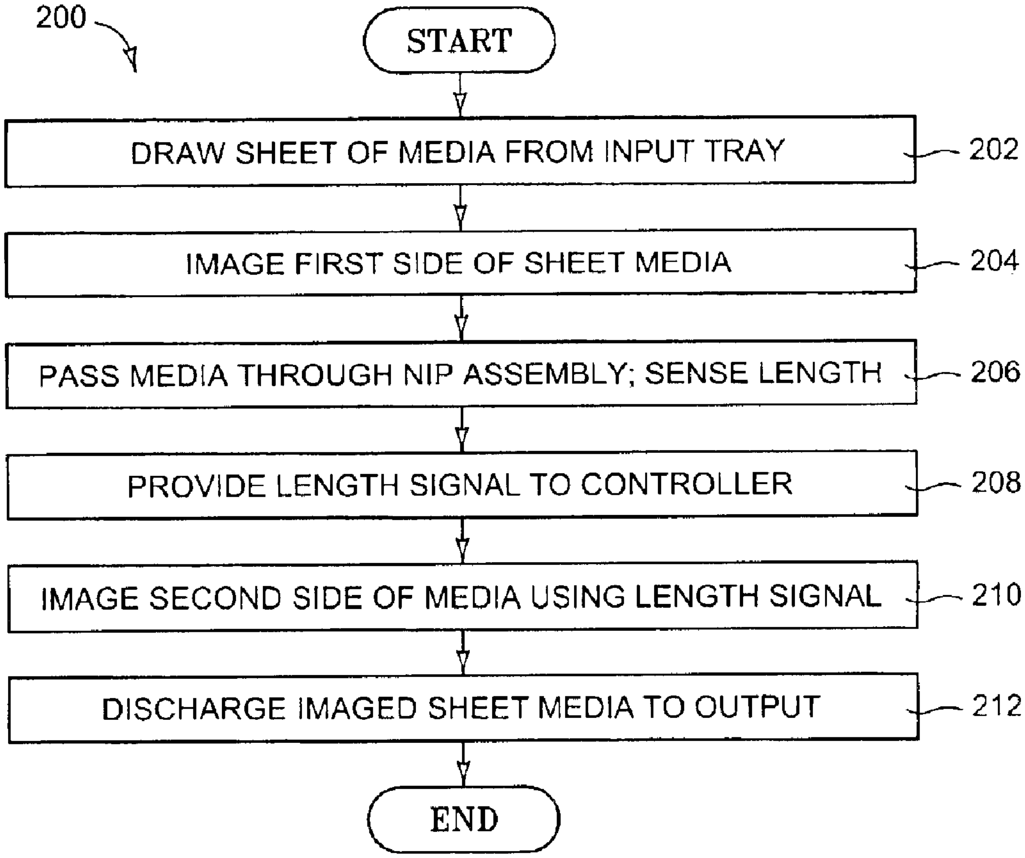
FIG. 3 is a flowchart depicting a method in accordance with another embodiment of the present invention.

FIG. 3 is a flowchart depicting a method 200 in accordance with an embodiment of the present invention. The method 200 is described within the context of the imaging apparatus 100 of FIG. 1 for clarity.

In step 202, the controller 102 causes a sheet of media S to be drawn from the input tray 128 and transported into cooperative orientation with the first imaging engine 104.

In step 204, the controller 102 causes the first imaging engine 104 to selectively form images on the first side 106 of the sheet media S. It is assumed that such imaging by the first imaging engine 104 has changed (i.e., expanded or contracted) a lengthwise dimension of the imaged sheet media S from that of its pre-imaged condition, although the methods and apparatus of the present invention are equally applicable where no lengthwise dimensional change has occurred.

In step 206, the controller 102 causes the image-bearing sheet media S to be transported away from the first imaging engine 104 and into the nip assembly 108. The sheet media S is then transported (or drawn) through the nip assembly 108. In response, the sense element 116 and the sense circuit 118 cooperate to determine (i.e., sense and/or calculate) the length of the imaged sheet media S just passed through the nip assembly 108.

In step 208, the sense circuit 118 provides a length signal corresponding to the sensed and/or calculated lengthwise dimension of the imaged sheet media S to the controller 102.

In step 210, the controller 102 causes the imaged sheet media S to be transported into cooperative orientation with the second imaging engine 124. The second imaging engine 124 then selectively forms images on the second side 126 of the sheet media S under the control of the controller and in accordance with the length signal provided by the sense circuit 118. Thus, the images formed on the second side 126 of the sheet media S are in substantially desirable registration with the images previously formed on the first side 106 of the sheet media.

In step 212, the controller 102 causes the sheet media S, now bearing images on both the first side 106 and the second side 126, to be discharged to an output location (such as, for example, an output tray or bin). The method 200 is now complete.

As described above, the method 200 depicts the imaging of both sides of a single sheet of media S. It is to be understood that the method 200 can be repeated in a sequential manner, substantially as described above, for each of any suitable number of sheets of media within a document (i.e., print job). Furthermore, it is to be understood that the method depicted by flowchart 200 is generally applicable to any specific embodiment (i.e., particular definition of elements) of the imaging apparatus 100 or its equivalents within the context of the present invention.

Figure 4:
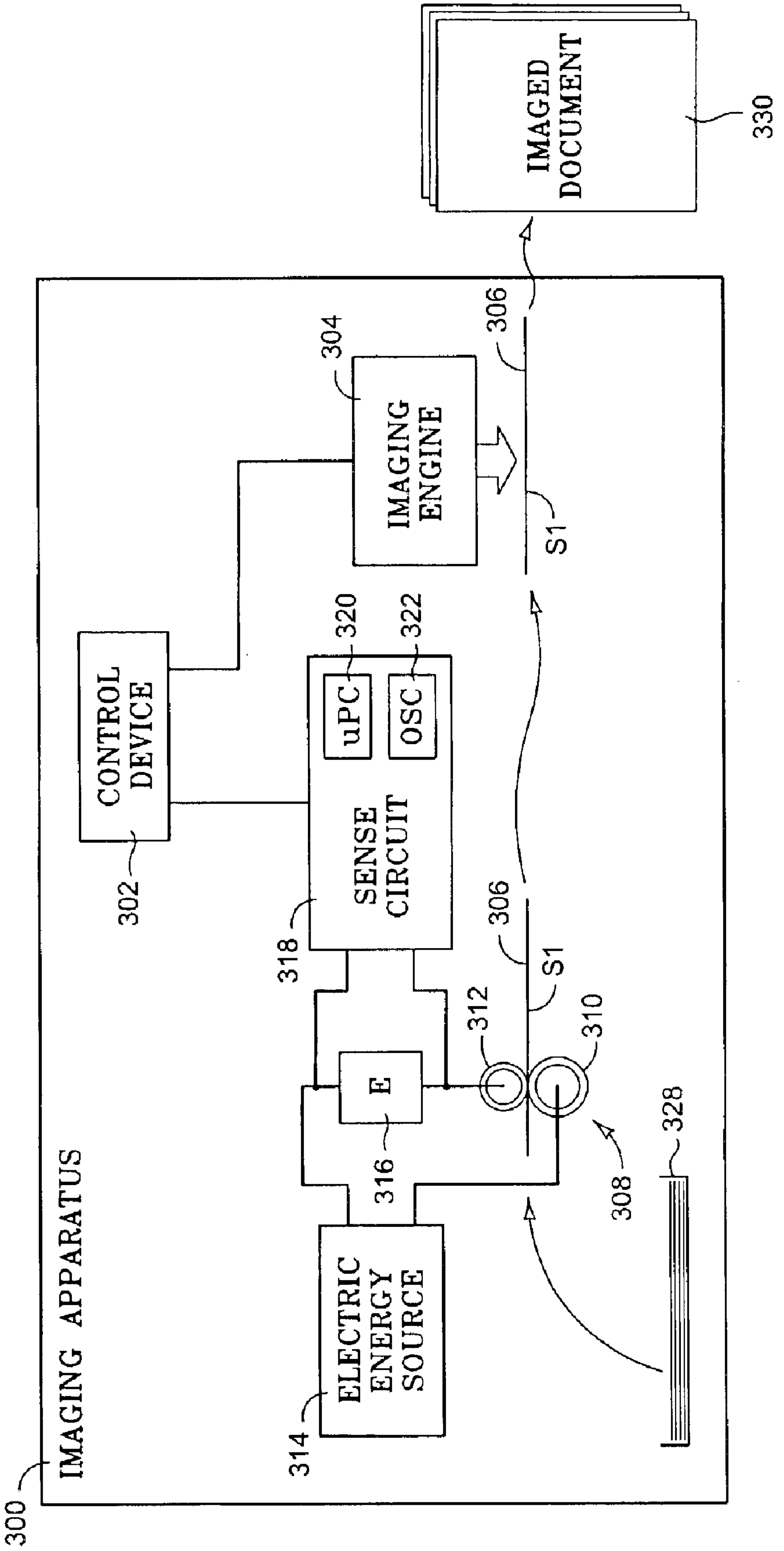
FIG. 4 is block diagram depicting an imaging apparatus in accordance with yet another embodiment of the present invention.

FIG. 4 is a block diagram depicting an imaging apparatus 300 in accordance with another embodiment of the present invention. The imaging apparatus 300 includes a controller 302, an imaging engine 304, and an input tray 328, which are respectively defined, configured and cooperative substantially as described above in regard to the controller 102, the first imaging engine 104, and the input tray 128 of the imaging device 100 of FIG. 1.

The imaging apparatus 300 further includes a nip assembly 308 including a roller 310 and a wheel 312, an electric energy source 314, a sense element 316, and a sense circuit 318, which are respectively defined, configured and cooperative substantially as described above in regard to the nip assembly 108, the roller 110, the wheel 112, the electric energy source 114, the sense element 116, and the sense circuit 118 of the imaging device 100 of FIG. 1. Other elements (not shown), typically required for normal operation of the imaging apparatus 300 are assumed to be present and can be appreciated by one of skill in the relevant arts. The specific elaboration of such elements (not shown) is not necessary for an understanding of the present invention.

Normal operation of the imaging apparatus 300 is generally performed as follows: The controller 302, in response to receiving a print job from an outside source (not shown), causes a sheet media S1 to be drawn from the input tray 328 and transported toward the nip assembly 308. The roller 310 and the wheel 312 then respectively rotate in frictional contact with a first side 306 and a second side 326 (not shown in FIG. 4) of the sheet media S1 as it is transported (passed, or drawn) through the nip assembly 308.

The passing of the sheet media S1 through the nip assembly 308 results in a corresponding, detectable change in an electrical potential across the sense element 316. Such a change is typically characterized by a relatively lower electrical potential across the sense element 316 corresponding to the presence of the sheet media S1 within the nip assembly 308, and a relatively greater electrical potential across the sense element 316 corresponding to an absence of the sheet media S1 within the nip assembly 308.

The sense circuit 318 utilizes a microprocessor 320 and an oscillator 322, in conjunction with sensing the electrical potential changes across the sense element 316, to calculate a lengthwise dimension of the sheet media S1 just passed through the nip assembly 308. The sense circuit 318 then provides a length signal corresponding to the calculated lengthwise dimension of the sheet media S1 to the controller 302.

The controller 302 then causes the sheet media S1 to be transported into cooperative orientation with the imaging engine 304. The imaging engine 304 then selectively forms images on the first side 306 of the sheet media S1, under the control of the controller 302 and in accordance with the length signal provided by the sense circuit 318.

The controller 302 then causes the image-bearing sheet media S1 to be discharged from the imaging apparatus 300. The process just described is then repeated, one sheet media S1 at a time, until the imaged document 330 is complete as defined by the print job received by the controller 302.

The imaging apparatus 300 uses the length signal provided by the sense circuit 318 (and associated cooperative elements) to ensure desirable registration of the images formed on the first side 306 of the sheet media S1 by the imaging engine 304. In this way, for example, the images formed by the imaging engine 304 are positioned and aligned with respect to any marginal areas (not shown) or other characteristics of the first side 306 of the sheet media S1. Such a scheme for imaging sheet media results in an imaging apparatus 300 that is desirable, for example, for use in humid environments or other usage conditions that tend to alter the overall planar dimensions of sheet media from their original parameters prior to the formation of images thereon.

Figure 5:
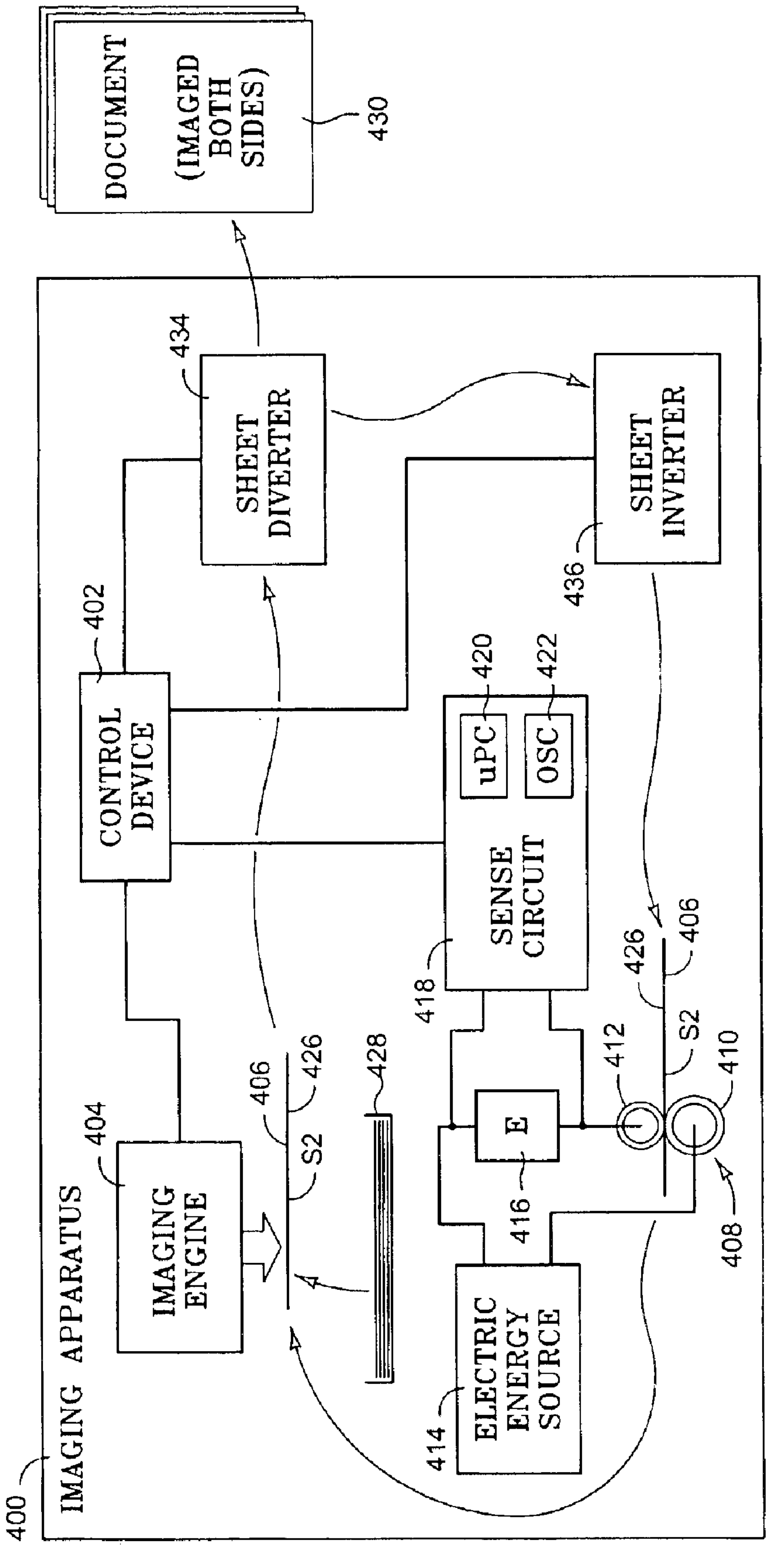
FIG. 5 is a block diagram depicting an imaging apparatus in accordance with still another embodiment of the present invention.

FIG. 5 is a block diagram depicting an imaging apparatus 400 in accordance with still another embodiment of the present invention. The imaging apparatus 400 includes a controller 402, an imaging engine 404, and an input tray 428, which are respectively defined, configured and cooperative substantially as described above in regard to the controller 102, the first imaging engine 104, and the input tray 128 of the imaging device 100 of FIG. 1.

The imaging apparatus 400 further includes a nip assembly 408 including a roller 410 and a wheel 412, an electric energy source 414, a sense element 416, and a sense circuit 418, which are respectively defined, configured and cooperative substantially as described above in regard to the nip assembly 108, the roller 110, the wheel 112, the electric energy source 114, the sense element 116, and the sense circuit 118 of the imaging device 100 of FIG. 1.

The imaging apparatus 400 further includes a sheet diverter 434. The sheet diverter 434 is coupled in control signal communication with the controller 402, and is configured to receive sheet media from the imaging engine 404. The sheet diverter is further configured to selectively route, or direct, received sheet media to either an output location, or to a sheet inverter 436 (described in detail hereafter), under the control of the controller 402. The sheet diverter 434 can be defined by any suitable arrangement of elements that function substantially as described above. One of skill in the related arts can appreciate that numerous suitable forms of the sheet diverter 434 can therefore be used, and that further particular elaboration is not needed for purposes of understanding the present invention.

The imaging apparatus 400 further includes the sheet inverter 436 introduced above. The sheet inverter is coupled in control signal communication with the controller 402, and is configured to receive sheet media from the sheet diverter 434. The sheet inverter 436 is further configured to turn (i.e., invert) received sheet media from a first-side-up to a second-side-up orientation, and to pass such inverted sheet media onto the nip assembly 408 and ultimately on to the imaging engine 404. The sheet inverter 436 can be defined by any suitable arrangement of elements that function substantially as described above. One of skill in the related arts is familiar with such suitable arrangements for the sheet inverter 436 and further elaboration is not required herein.

Other elements (not shown) typically required for normal operation of the imaging apparatus 400 are assumed to be present and can be appreciated by one of skill in the relevant arts. The specific elaboration of such elements (not shown) is not required for an understanding of the present invention.

Typical normal operation of the imaging apparatus 400 is as follows: The controller 402 is assumed to receive a print job from an exterior source. The controller 402 then causes, through the use of suitable transport and guiding mechanisms (not shown), a sheet of media S2 to be drawn from the input tray 428 and positioned with a first side 406 in cooperative orientation with the imaging engine 404. The imaging engine 404 then selectively forms images on the first side 406 of the sheet media S2 under the control of the controller 402.

The controller 402 then causes the imaged sheet media S2 to be routed to the sheet diverter 434. The sheet diverter 434 then selectively directs the imaged sheet media S2 into the sheet inverter 436, under the control of the controller 402. The sheet inverter 436 receives the imaged sheet media S2 from the sheet diverter 434, and inverts, or turns, the sheet media S2 to a second side 426 up orientation. The controller 402 then causes the inverted sheet media S2 to be transported on to the nip assembly 408.

The inverted sheet media S2 is then transported (or drawn) through the nip assembly 408. In response, the electric energy source 414, the roller 410, the wheel 412, and the sense element 416 cooperate to provide a detectable change in electrical potential across the sense element 416, substantially as described above in regard to the imaging apparatus 100 of FIG. 1, in correspondence to the passing of the inverted sheet media S2 through the nip assembly 408. The sense circuit 418 detects the change in electrical potential across the sense element 416 and, using the microprocessor 418 and the oscillator 420, provides a length signal corresponding to a calculated lengthwise dimension of the inverted sheet media S2 to the controller 402.

The controller 402 then causes the inverted sheet media S2 to be returned to the imaging engine 404, with the second side 426 positioned in cooperative orientation therewith. The imaging engine 404 then selectively forms images on the second side 426 of the sheet media S2 in desired registration with the images borne on the first side 406 of the sheet media S2, under the control of the controller 402 an in accordance with the length signal provided by the sense circuit 418.

The controller then causes the sheet media S2, which now bears images formed on both the first side 406 and the second side 426, to be directed and transported to an output location by way of the sheet diverter 434. This process is then substantially repeated as described above, one sheet of media at a time, until a document 430 has been completed as defined by the requirements of the print job received at the controller 402. The imaging apparatus 400 thus provides for the registered imaging of both sides of a sheet media S2, through the use of a single imaging engine 404. It will be appreciated that in FIG. 5 the nip assembly 408 is indicated as being placed after the sheet inverter 436. However, the nip assembly 408 can be placed before the sheet inverter 436 (and after the imaging engine 404) to equal effect.

Embodiments of the present invention can be generally summarized as follows: A nip assembly (e.g., nip assembly 108 of FIG. 1), including a pair of at least partially electrically conductive rotatable elements (e.g., roller 110 and wheel 112) is provided. Each of the pair of rotatable elements is supported so that they are normally in physical, electrically conductive contact with one another. Electrically coupled to the nip assembly are a source of electrical energy (e.g., source 114) and a sense element (e.g., sense element 116), thus forming a sheet media length detection device, generally defined by an electrical circuit. An electronic sense circuit (e.g., 118, FIG. 1), typically including a microprocessor (e.g., 120), oscillator (e.g., 122), and/or microcontroller, is coupled in electrical sensing orientation with the sense element of the sheet media length detection device.

In use, a sheet media is transported or drawn through the nip assembly at a known, substantially constant forward velocity, driving the pair of rotatable elements out of physical contact with each other. The separation of the rotatable elements results in a detectable change in electrical potential across the sense element, corresponding to the presence of the sheet media within the nip assembly. When the sheet media has exited (passed completely through) the nip assembly, the pair of rotatable elements return to physical contact with each other, and the electrical potential across the sense element substantially returns to a voltage corresponding to the absence of sheet media within the nip assembly.

The sense circuit then senses, or calculates, a lengthwise dimension for the sheet media just passed through the nip assembly, in response to the changes in electrical potential across the sense element. The sense circuit then provides a signal corresponding to the length of the sheet media, which is generally communicated to a controller of an imaging apparatus and is used thereby to selectively control operation of one or more imaging engines, sheet transport and guidance mechanisms, and/or other elements required for the normal operation of the imaging apparatus.

Accordingly, a further embodiment of the present invention provides for a method of controlling an imaging apparatus 100, the method including the steps of selectively imaging a first side 106 of a sheet media S, and then passing the imaged sheet media S through a nip assembly 108. The method then proceeds by detecting a change in electrical potential V across a sensing element 116 electrically coupled to the nip assembly 108, in correspondence to the passing of the sheet media S through the nip assembly 108.

Then, a length of the sheet media S is determined in response to detecting the change in electrical potential V, and a length signal is provided to a controller 102 of the imaging apparatus 100 by a sense circuit 118 in response to the determining. This length determination typically includes using a processor 120 to count a plurality of clock pulses provided by an oscillator 122. Thereafter, the controller 102 uses the length signal to cause the selective imaging of a second side 126 of the sheet media S by way of a second imaging engine 124.

While the above methods and apparatus have been described in language more or less specific as to structural and methodical features, it is to be understood, however, that they are not limited to the specific features shown and described, since the means herein disclosed comprise preferred forms of putting the invention into effect. The methods and apparatus are, therefore, claimed in any of their forms or modifications within the proper scope of the appended claims appropriately interpreted in accordance with the doctrine of equivalents.

I claim:

1. A sheet media length detection device, comprising:

a nip assembly including a first rotatable member and a second rotatable member each at least partially electrically conductive and respectively configured to rotate in contact with each other, the nip assembly configured to selectively pass a sheet media between the first and the second rotatable members at a known speed;

a source of electrical energy;

a sense element electrically coupled to the source of electrical energy and the first and the second rotatable members, the sense element configured such that a first or a second electrical potential is present across the sense element in respective correspondence to the presence or absence of a sheet of media between the first and second rotatable members; and a sense circuit electrically coupled to the sense element and configured to provide a length signal in correspondence to a length of a sheet of media passed between the first and the second rotatable members in response to monitoring the first and the second electrical potentials across the sense element.

2. The sheet media length detection device of claim 1, and wherein the sense element is defined by a resistor.

3. The sheet media length detection device of claim 1, and wherein the sense element is defined by a diode.

4. The sheet media length detection device of claim 1, and wherein the sense element is defined by a semiconductor device.

5. The sheet media length detection device of claim 1, and wherein the source of electrical energy is defined by one of a direct-current electrical source, or an alternating-current electrical source.

6. The sheet media length detection device of claim 1, and wherein the first rotatable member is formed from one of brass, bronze, or an at least slightly electrically conductive pliable material.

7. The sheet media length detection device of claim 1, and wherein the second rotatable member is formed from one of brass, bronze, or an at least slightly electrically conductive pliable material.

8. An imaging apparatus, comprising:

a controller;

a first imaging engine coupled in control signal communication with the controller and configured to selectively form images on a sheet media;

a second imaging engine coupled in control signal communication with the controller and configured to selectively form images on a sheet media;

a nip assembly including an at least partially electrically conductive roller and an electrically conductive wheel, the nip assembly configured to pass a sheet media from the first imaging engine to the second imaging engine; and a circuit electrically coupled to the nip assembly and coupled in signal communication with the controller, wherein:

the circuit includes a sense element configured such that a first electrical potential is present across the sense element when a sheet media is present within the nip assembly and a second electrical potential is present across the sense element when a sheet media is not present within the nip assembly;

the circuit is configured to provide a length signal to the controller corresponding to a length of a sheet media passed through the nip assembly; and the controller is configured to selectively control a normal operation of the second imaging engine in correspondence to the length signal.

9. The imaging apparatus of claim 8, and wherein the first imaging engine is further configured to selectively form images on a first side of a sheet media, and wherein the second imaging engine is further configured to selectively form images on a second side of the sheet media after the sheet media has passed through the nip assembly.

10. The imaging apparatus of claim 8, and wherein the sense element comprises one of a resistor, a diode, or a semiconductor device.

11. The imaging apparatus of claim 8, and wherein the roller is formed from an at least partially electrically conductive pliable material.

12. The imaging apparatus of claim 8, and wherein the wheel is formed from at least one of brass, bronze, or an at least partially electrically conductive pliable material.

13. The imaging apparatus of claim 8, and wherein the circuit includes a processor configured to calculate the length of the sheet media passed through the nip assembly, and wherein the circuit is further configured to provide the length signal in response to the calculation.

14. The imaging apparatus of claim 13, and wherein the circuit includes an oscillator electrically coupled to the processor and configured to provide a series of clock pulses, and wherein the processor is further configured to calculate the length of the sheet media passed through the nip assembly in response to counting a plurality of the clock pulses provided by the oscillator.

15. An imaging apparatus, comprising:

a controller;

an imaging engine coupled in control signal communication with the controller and configured to selectively form images on a sheet media;

a nip assembly including an at least partially electrically conductive roller and an electrically conductive wheel, the nip assembly configured to pass a sheet media to the imaging engine; and a circuit electrically coupled to the nip assembly and coupled in signal communication with the controller, wherein:

the circuit includes a sense element configured such that a first electrical potential is present across the sense element when a sheet media is present within the nip assembly and a second electrical potential is present across the sense element when a sheet media is not present within the nip assembly;

the circuit is configured to provide a length signal to the controller corresponding to a length of a sheet media passed through the nip assembly; and the controller is configured to selectively control a normal operation of the imaging engine in correspondence to the length signal.

16. The imaging apparatus of claim 15, and wherein the nip assembly and the imaging engine and the circuit are respectively further configured such that the nip assembly passes a sheet media to the imaging engine and the circuit provides the length signal to the controller prior to the imaging engine selectively forming any images on the sheet media.

17. The imaging apparatus of claim 15, and wherein the circuit includes a processor configured to calculate the length of a sheet media passed through the nip assembly, and wherein the circuit is further configured to provide the length signal in response to the calculation.

18. The imaging apparatus of claim 17, and wherein the circuit includes an oscillator electrically coupled to the processor and configured to provide a series of clock pulses, and wherein the processor is further configured to calculate the length of the sheet media passed through the nip assembly in response to counting a plurality of the clock pulses provided by the oscillator.

19. The imaging apparatus of claim 15, and wherein the sense element is defined by one of a resistor, a diode, or a semiconductor device.

20. The imaging apparatus of claim 15, and wherein the roller is formed from an at least partially electrically conductive pliable material.

21. The imaging apparatus of claim 15, and wherein the wheel is formed from at least one of brass, bronze, or an at least partially electrically conductive pliable material.

22. The imaging apparatus of claim 15, and further comprising a sheet inverter coupled in control signal communication with the controller and configured to receive a sheet media imaged on a first side and to pass the sheet media to the nip assembly and thereafter to the imaging engine in a second-side-up orientation, and wherein the imaging engine is further configured to selectively form images on the second side of the sheet media as controlled by the controller.

23. An imaging apparatus, comprising:

control means;

first and second imaging means respectively coupled to the control means; and length sensing means coupled to the control means and disposed in sheet media passing relationship between the first and second imaging means, the length sensing means including a sense element configured to such that a first electrical potential is present across the sense element when a sheet media is present within the length sensing means and a second electrical potential is present across the sense element when a sheet media is not present within the length sensing means, the length sensing means configured to provide a signal to the control means in response to a length of sheet media passed through the length sensing means.

24. The imaging apparatus of claim 23, and wherein the control means is configured to selectively control the second imaging means in response to signal provided by the length sensing means.

25. A method of controlling an imaging apparatus, comprising:

selectively imaging a first side of a sheet media;

passing the imaged sheet media through a nip assembly;

detecting a change from a first electrical potential to a second electrical potential across a sense element in correspondence to the passing;

determining a length of the sheet media in response to the detecting;

providing a length signal in response to the determining; and selectively imaging a second side of the sheet media in correspondence to the length signal.

26. The method of claim 25, and wherein the the sense element is defined by one of a resistor, a diode, or a semiconductor device.

27. The method of claim 25, and wherein the determining the length of the sheet media includes counting a plurality of clock pulses provided by an oscillator.

28. A sense circuit for use with an imaging apparatus, comprising:

a processor;

a sense element defined by one of a resistor, a diode, or a semiconductor device;

an oscillator coupled in signal communication with the processor and configured to generate a stream of substantially regular clock pulses;

a computer-readable storage media coupled in data communication with the processor and storing a program code, the program code configured to cause the processor to:

monitor an electrical potential signal across the sense element;

count a plurality of the clock pulses generated by the oscillator during a predefined shift in the electrical potential signal; and provide a length signal on a signal line of the processor in correspondence to the counted plurality of clock pulses.

29. The sense circuit of claim 28, and wherein the program code is further configured to cause the processor to repeat the monitoring and the counting and the providing in correspondence to a repetition of the predefined shift of the electrical potential signal.

* * * * *